(12) United States Patent
Okada et al.

(10) Patent No.: US 6,591,736 B2
(45) Date of Patent: Jul. 15, 2003

(54) MASTER CYLINDER

(75) Inventors: Akimoto Okada, Aichi-ken (JP); Naoyasu Enomoto, Aichi-ken (JP); Toshihiro Nakano, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 148 days.

(21) Appl. No.: 09/941,639

(22) Filed: Aug. 30, 2001

(65) Prior Publication Data

US 2002/0029568 A1 Mar. 14, 2002

(30) Foreign Application Priority Data

Aug. 30, 2000 (JP) .......................... 2000-261792
Sep. 29, 2000 (JP) .......................... 2000-300016

(51) Int. Cl.$^7$ ................................ F01B 31/00
(52) U.S. Cl. .......................... 92/135; 60/562
(58) Field of Search ............... 92/135; 60/562

(56) References Cited

U.S. PATENT DOCUMENTS 5,878,575 A * 3/1999 Kreh et al. ............... 60/562
6,012,288 A 1/2000 Gualdoni et al.
6,519,940 B2 * 2/2003 Lange et al. ............... 60/562

FOREIGN PATENT DOCUMENTS

JP          10-44967 A      2/1998
JP          2000-71969 A    3/2000

* cited by examiner

*Primary Examiner*—Edward K. Look
*Assistant Examiner*—Michael Leslie
(74) *Attorney, Agent, or Firm*—Burns, Doane, Swecker & Mathis, LLP

(57) ABSTRACT

A master cylinder includes a cylinder housing having a rearwardly opening inner bore, a piston having a forwardly opening bore positioned in the inner bore of the cylinder housing, a spring disposed in the inner bore of the piston, a stopper supporting a front end of the spring, a retainer disposed in the inner bore of the piston and supporting a rear end of the spring, and a rod connecting the retainer and the stopper while allowing the spring to compress in the axial direction. A plurality of projection portions are formed on the outer circumferential portion of the retainer and the retainer is pressed into the inner bore of the piston via the projection portions.

19 Claims, 4 Drawing Sheets

MASTER CYLINDER

This application is based on and claims priority under 35 U.S.C. §119 with respect to Japanese Patent Application No. 2000-261792 filed on Aug. 30, 2000 and Japanese Patent Application No. 2000-300016 filed on Sep. 29, 2000, the entire content of both of which is incorporated herein by reference.

FIELD OF THE INVENTION

This invention relates to a master cylinder. More particularly, the present invention pertains to a master cylinder used to in a brake device or a clutch device of a vehicle.

BACKGROUND OF THE INVENTION

An example of a known master cylinder is disclosed in Japanese Patent Laid-Open Publication No. 2000-71969. The master cylinder includes a cylinder housing having an inner bore whose rear end is open, a piston having a bore opening forward and inserted into the inner bore of the cylinder housing, a spring disposed in the bore of the piston, and a retainer disposed between the piston and the spring. The retainer is secured to the rear end of a rod and is inserted to the bottom portion of the bore of the piston. The rod supports a stopper so as to be able to move relative to the stopper and to engage the stopper. The spring is interposed between the retainer and the stopper so that a set length of the spring is set to the total of the length of the rod and the length of the stopper.

However, with the above-described master cylinder, because the retainer, the rod, the stopper and the spring are not united with the piston, the workability from the standpoint of assembling the piston into the cylinder housing deteriorates.

An example of a master cylinder in which a retainer, a rod, a stopper and a spring are united with a piston is disclosed in Japanese Patent Laid-Open Publication No. 10 (1998)-44967. In this master cylinder, an expanded annular groove is formed on an inner circumferential surface adjacent to the bottom portion of a bore of the piston. An expanded diameter portion formed on the outer circumferential portion of the spring or an outer circumferential portion of the retainer is engaged with the expanded annular groove. However, in this master cylinder, because the expanded annular groove has to be formed on the inner circumferential surface of the bore of the piston, the machining for the bore of the piston is complicated and so the machining cost is increased. Further, air is apt to stay in the expanded annular groove.

Another example of a master cylinder in which a rod, a stopper and a spring are united with a piston is disclosed In U.S. Pat. No. 6,012,288. In this master cylinder, the retainer is omitted and the rear end portion of the rod is fitted into a fitting hole which is formed on the bottom portion of the bore of the piston. However, in this master cylinder, because the fitting hole has to be formed on the bottom portion of the bore of the piston, the machining cost for the bore of the piston is increased. Further, the axial length of the piston required to form the fitting hole is increased and so it is difficult to miniaturize the master cylinder.

It would thus be desirable to provide a master cylinder which is not as susceptible to the disadvantages and drawbacks discussed above.

A need exists for a master cylinder in which a retainer, a rod, a stopper and a spring can be united with a piston without increasing the machining cost of the piston and without increasing the axial length of the master cylinder.

SUMMARY OF THE INVENTION

A master cylinder includes a cylinder housing having a rearwardly opening inner bore, a piston having a forwardly opening bore opened and positioned in the inner bore of the cylinder housing, a spring disposed in the inner bore of the piston, a stopper supporting a front end of the spring, a retainer disposed in the inner bore of the piston and supporting a rear end of the spring, and a rod connecting the retainer and the stopper while allowing the spring to compress in the axial direction. A plurality of projection portions are formed on the outer circumferential portion of the retainer and the retainer is pressed into the inner bore of the piston via the projection portions.

According to another aspect of the invention, a master cylinder includes a cylinder housing having an inner bore that is open at a rearwardly facing end of the cylinder housing, a piston positioned in the inner bore of the cylinder housing and having a bore that is open at a forwardly facing end of the piston, a spring disposed in the bore of the piston, a stopper supporting a front end of the spring, and a retainer disposed in the bore of the piston and supporting a rear end of the spring. The retainer is disc-shaped and possesses a plurality of circumferentially spaced apart and radially outwardly directed projecting portions that engage an inner surface of the bore in the piston. A rod extends between the retainer and the stopper in a manner that allows the spring to be axially compressed.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 4b is a side view of the retainer shown in FIG. 4a;

FIG. 6b is a side view of the retainer shown in FIG. 6a.

DETAILED DESCRIPTION OF THE INVENTION

Figure 1:
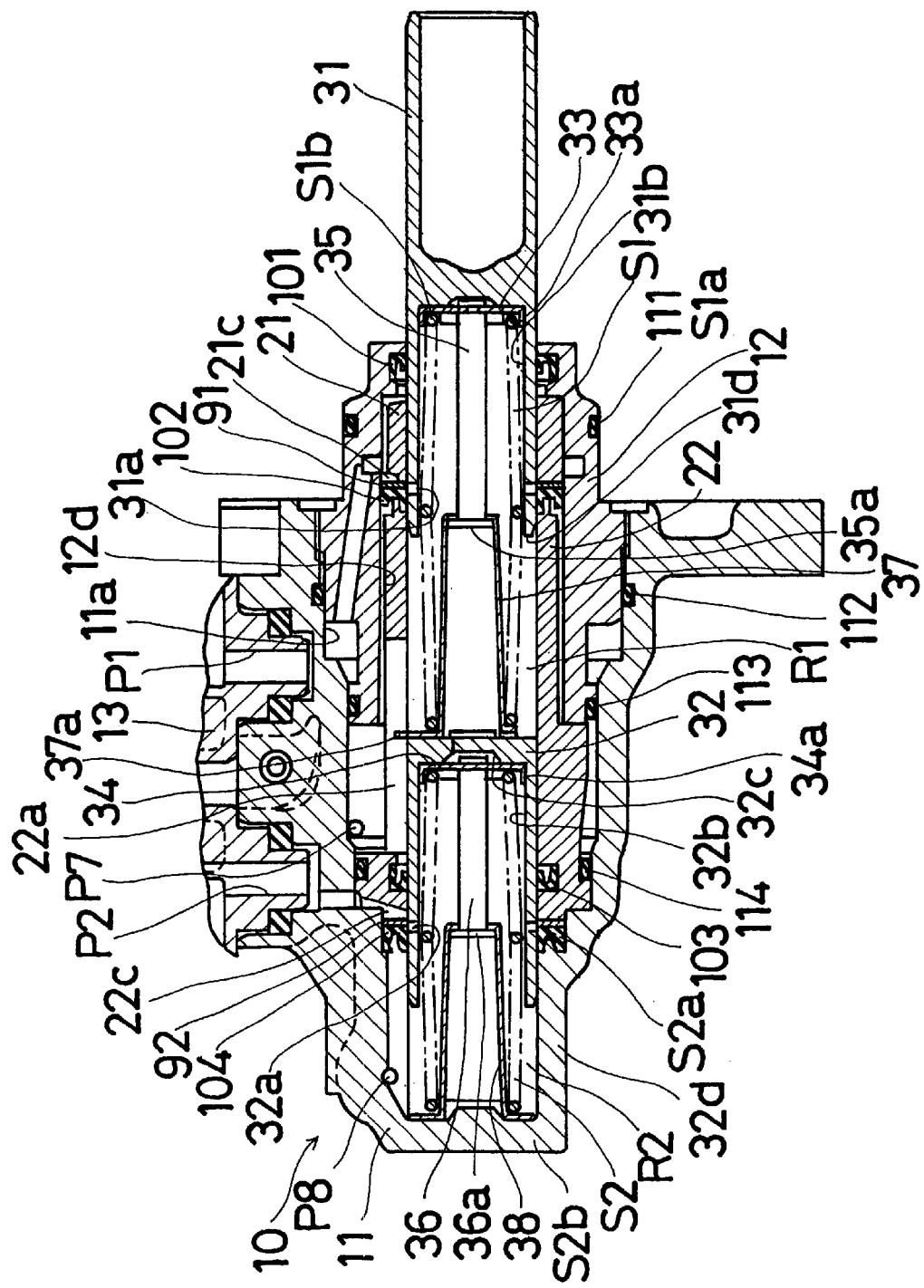
FIG. 1 is a cross-sectional view of a master cylinder according to the present invention illustrating the master cylinder during a no braking condition.

Referring initially to FIG. 1, the master cylinder includes a cylinder housing 10 including a body 11 and a cylinder cap 12, a first cup seal 101, a guide 21, a first spacer 91, a sleeve 22, a second cup seal 102, a second spacer 92, a third seal cup 103, a fourth seal cup 104, a first piston 31 and a second piston 32 which are disposed in the cylinder housing 10.

The body 11 can be made of metal such as cast iron or aluminum alloy and includes a stepped inner bore 11a opening to the rear end (i.e., the right end of FIG. 1), reservoir connecting ports P1, P2 connected to a reservoir 13, and outlet ports P7, P8 each connected to the wheel cylinders via respective hydraulic brake circuits. An internal screw threaded portion is formed on the opening end portion of the inner bore 11a. The annular fourth cup seal 104 and the second spacer 92 are coaxially disposed in the inner bore 11a of the body 11. The fourth cup seal 104 is disposed between the body 11 and the second piston 32 and seals in a liquid-tight manner a second pressure chamber R2 in communication with the outlet port P8. The annular second spacer 92 is provided between the fourth cup seal 104 and the sleeve 29, and allows fluid flow in the axial direction at the inner and outer periphery. The annular second spacer 92 also prevents a part of the fourth cup seal 104 from biting into a communication groove 22c of the sleeve 22 when pressure is generated in the second pressure chamber R2.

The cylinder cap 12 can be made of metal such as cast iron or aluminum alloy and includes an external screw threaded portion that is screw threaded with the internal screw threaded portion of the body 11 at generally the middle portion of the outer periphery of the cylinder cap 12. The cylinder cap 12 also includes a cylinder portion which is fitted into the inner bore 11a of the body 11 and which accommodates a small diameter cylindrical portion of the sleeve 22. The cylinder cap 12 is assembled in a liquid-tight manner to the body 11 via a first O-ring 112 and a second O-ring 113, and fastens the fourth cup seal 104, the second spacer 92, and the sleeve 22 at a left end portion of the cylindrical portion. The cylinder cap 12 also fastens the second cup seal 102, the first spacer 91, and the guide 21 at a right end stepped portion of a stepped internal bore 12d. The second cup seal 102, the first spacer 91 and the guide 21 are coaxially fitted into the stepped internal bore 12d of the cylinder cap 12. The annular first spacer 91 provided between the second cup seal 102 and the guide 21 allows fluid flow in the axial direction at both the inner and outer peripheries and prevents a part of the second cup seal 102 from biting into a communication groove 21c of the guide 21 when pressure is generated in a first pressure chamber R1.

The first cup seal 101 is assembled to the inner periphery of the right end portion of the cylinder cap 12. A third O-ring 111 is assembled to the outer periphery of the right end portion of the cylinder cap 12. The second O-ring 113 which is assembled to the outer periphery of the left end portion of the cylinder cap 12 provides a liquid-tight seal between the body 11 and the cylinder cap 12. The first O-ring 112 is assembled to the inner periphery of the body 11 at a position rightward of the O-ring 113 and provides a liquid-tight seal between the body 11 and the cylinder cap 12.

The first cup seal 101 provides a liquid-tight seal between the cylinder cap 12 and the first piston 31, while the third O-ring 111 provides a liquid-tight seal between a housing of a brake booster (not shown) and the cylinder cap 12. The right end outer periphery of the cylinder cap 12 is formed in a hexagonal shape so that by rotating the hexagonal portion with a tool, the cylinder cap 12 can be assembled to and disassembled from the body 11.

The cylindrical sleeve 22 can be made of resin and has a stepped portion on the outer periphery of the middle portion. The cylindrical sleeve 22 is provided with a smaller outer diameter cylindrical portion at the rear portion and a larger outer diameter cylindrical portion at the front portion. The small diameter cylindrical portion of the sleeve 22 is coaxially fitted into the internal bore 12d of the cylinder cap 12 and the large diameter cylindrical portion is supported by the stepped portion of the inner bore 11a and the left end surface of the cylinder cap 12.

The annular third seal cup 103 is assembled to the inner circumference of the large diameter cylindrical portion of the sleeve 22 and provides a liquid-tight seal between the sleeve 22 and the second piston 32. A fourth O-ring 114 is assembled on the outer periphery of the large diameter cylindrical portion of the sleeve 22 and provides a liquid-tight seal between the sleeve 22 and the body 11.

A plurality of communication grooves 22c are formed in the sleeve 23 so as to be inclined towards the left end portion of the large diameter cylindrical portion of the sleeve 23. The communication grooves 22c are positioned at a predetermined interval in the peripheral direction and are always in communication with the reservoir connecting port P2. The communication grooves 22c are in communication with a piston port 32a provided on the second piston 32 via a gap between the second spacer 92 and the second piston 32. A guiding groove 22a is formed along a part of the small diameter cylindrical portion and the large diameter cylindrical portion of the sleeve. The guiding groove 22a extends in the axial direction and opens towards the radial direction to always connect the first pressure chamber R1 with the outlet port P7. The rear end portion of the guiding groove 22a functions as a stopper restricting the retracting distance of the first piston 31 and the second piston 32 when a radial projection 37a provided on a first stopper 37 contacts the rear end portion of the guiding groove 22a. The guiding groove 22a functions as a guiding passage for guiding the radial projection 37a of the first stopper 37 when the first stopper 37 moves with the second piston 32 as a unit in the forward and rearward directions.

The cylindrical guide 21 can be made of resin and is positioned at the internal bore 12d of the cylinder cap 12. The cylindrical guide 21 is provided with communication grooves 21c extending along the outer periphery to both ends of the guide. The plurality of communication grooves 21c are formed along the outer periphery of the guide 21 in the axial direction, are U-shaped along both ends of the guide in the radial direction and are provided at a predetermined interval. The communication grooves 21c are always in communication with the reservoir connecting port P1 via a passage formed in the cylinder cap 12. The communication grooves 21c are also always in communication with piston ports 31a provided on the first piston 31 through a gap between the first spacer 91 and the first piston 31.

The first piston 31 is inserted into the cylinder housing 10 through the cylinder cap 12 and is slidably supported in the axial direction by the sleeve 23 and the guide 26. The first piston 31 is provided with an inner bore 31b opening into the first pressure chamber R1 and is urged rearward by a first spring S1. The amount of backward movement of the first piston 31 with respect to the second piston 32 is restricted by a first rod 35, a first retainer 33 and the first stopper 37. This amount of backward movement of the first piston 31 corresponds to a predetermined attaching length of the first spring S1.

The first spring S1 has a largest outer diameter portion S1a at the middle portion in the axial direction. The outer diameter of the largest outer diameter portion S1a is larger than that of a small outer diameter portion S1b located at both ends in the axial direction. The largest outer diameter portion S1a is located in the inner bore 31b of the first piston 31 as shown in FIG. 1 when the master cylinder is not operated. That is, the largest outer diameter portion S1a is located toward the bottom portion side of the inner bore 31b with respect to the opening end surface 31d when the master cylinder is not operated. The first spring S1 is disposed in compression to have the predetermined attaching length by the first retainer 33 fixed to the first piston 31, the first rod 35 fixed to the first retainer 33 and the first stopper 37 connected to the first rod 35.

Figure 3:
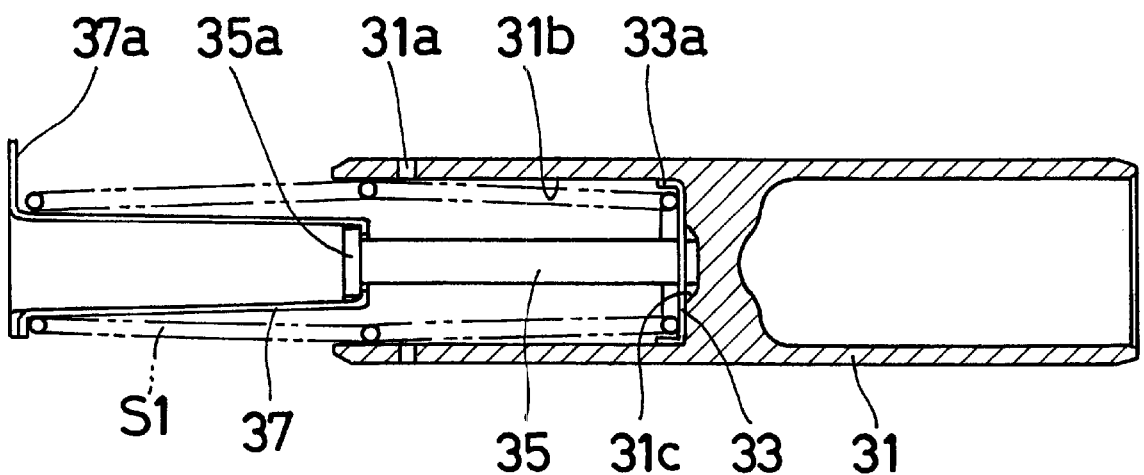
FIG. 3 is an enlarged cross-sectional view of a first piston used in the master cylinder shown in FIGS. 1 and 2.

The first rod 35 can be made of metal and is assembled as one unit with the first piston 31 via the first retainer 33 at the right end portion as shown in FIG. 3. The first rod 35 moves in the axial direction as a unit with the first piston 31. The first retainer 33 can be made of metal and also serves as a spring retainer of the first spring S1. The first retainer 33 is fixed on the right end portion of the first rod 35 and is pressed into the inner bore 31b of the piston 31.

Figure 4A:
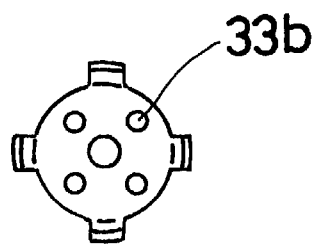
FIG. 4a is a plan view of a retainer used in the master cylinder shown in FIGS. 1 and 2.
Figure 4B:
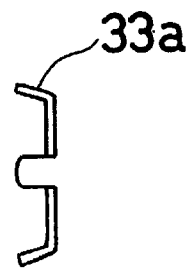

As shown in FIGS. 4a and 4b, the first retainer 33 is disc-shaped and has four projections 33a. The four projections 33a project outwardly in the radial direction and are formed on the outer circumference of the first retainer 33. Adjacent projections 33a are separated from each other at equal intervals in the circumferential direction. The top end portion of each projections 33a is bent toward the first stopper 37 as shown in FIGS. 1 and 4b (i.e., in the axial direction) and is located on a concentric circle whose diameter is larger than the inner diameter of the inner bore 31b of the first piston 31. Further, the diameter of the concentric circle in which the projections 33a are located expands toward the first stopper 37. That is, the projections 33a are angled slightly outwardly from a perpendicular orientation with respect to the dis-shaped portion of the first retainer 33 as shown in FIG. 4b. Therefore, upon pressing the first retainer 33 into the inner bore 31b of the first piston 31, the first retainer 33 is pressed into the inner bore 31b from the small diameter side of the projections 33a and can be easily pressed into the inner bore 31b to the bottom portion of the bore. Further, when a force is applied to the first retainer 33 toward the first stopper 37 with respect to the first piston 31 after the first retainer 33 has been pressed into the inner bore 31b, the projections 33a bite into or engage the inner circumferential surface of the inner bore 31b, thus preventing the first retainer 33 from coming off of or becoming separated from the first piston 31. As a result, it is possible to easily assemble the first piston to which the first stopper 37, the first rod 35, the first retainer 33 and the first spring S1 are united to the cylinder housing 10.

A concave portion or recessed portion 31c is formed on the bottom surface of the inner bore 31b of the first piston 31 to receive the right end portion of the first rod 35. The inner diameter of the inner circumference of the concave portion 31c expands or increases in a direction towards the open end of the inner bore 31b, and the inner circumference of the concave portion 31c tapers toward the bottom of the concave portion 31c.

In addition, four holes 33b are formed on the disc portion of the first retainer 33 as illustrated in FIG. 4a. Thus, air mixed into the brake fluid which enters the concave portion 31c is able to escape out of the concave portion 31c through the holes 33b and the piston ports 31a to the outer circumference side of the first piston 31. Therefore, air mixed into the brake fluid does not stay in the concave portion 31c.

The first stopper 37 can be made of metal and is provided between the first spring S1 and the second piston 32. The right end portion of the first stopper 37 is engaged with a head portion 35a of the first rod 35 so as to be able to move backward with respect to the first rod 35. The left end portion of the stopper 37 includes the radial projection 37a extending outwardly in the radial direction.

The second piston 32 can also be made of metal and is positioned coaxially with respect to the first piston 31 and is slidably supported in the axial direction by the sleeve 22 in the cylinder housing 10. The second piston 32 is provided with an inner bore 32b that opens into the second pressure chamber R2 and is urged rearward by a second spring S2. The amount of backward movement of the second piston 32 is restricted by a second rod 36, a second retainer 34 and a second stopper 38. This amount of the backward movement of the second piston 32 corresponds to a predetermined attaching length of the second spring S2.

The second spring S2 has a largest outer diameter portion S2a at the middle portion in the axial direction. The outer diameter of the largest outer diameter portion S2a is larger than the diameter of a small outer diameter portion S2b located at both ends in the axial direction. The largest outer diameter portion S2a is located in the inner bore 32b of the second piston 32 as shown in FIG. 1 when the master cylinder is not operated. That is, the largest outer diameter portion S2a is located at the bottom portion side of the inner bore 32b with respect to the opening end surface 32d when the master cylinder is not operated. The second spring S2 is disposed in compression to have the predetermined attaching length by the second retainer 34 fixed to the second piston 32, the second rod 36 fixed to the second retainer 34, and the second stopper 38 connected to the second rod 36.

The second rod 36 can be made of metal and is assembled as a unit with the second piston 32 via the second retainer 34 at the right end portion of the second rod 36. The second rod 36 moves in the axial direction as a unit with the second piston 32. The second retainer 34 can be made of metal and also serves as a spring retainer of the second spring S1. The second retainer 34 is fixed on the right end portion of the second rod 36. The second retainer 34 is pressed into the inner bore 32b of the piston 32.

The second retainer 34 is disc-shaped and has four projections 34a which project outward in the radial direction and are formed on the outer circumference of the second retainer 34. Adjacent projections 34a are separated from each other at equal intervals in the circumferential direction. The top end portion of each projection 34a is bent toward the second stopper 38 (i.e., in the axial direction) and is located on a concentric circle whose diameter is larger than the inner diameter of the inner bore 32b of the second piston 32. Further, the diameter of the concentric circle in which the projections 34a are located expands toward the second stopper 38. That is, the projections 34a are angled slightly outwardly from a perpendicular orientation with respect to the dis-shaped portion of the second retainer 34. Therefore, upon pressing the second retainer 34 into the inner bore 32b of the second piston 32, the second retainer 34 is pressed into the inner bore 32b from the small diameter side of the projections 34a and can be easily pressed into the inner bore 32b to the bottom portion of the bore. Further, when a force is applied to the second retainer 34 toward the second stopper 38 with respect to the second piston 32 after the second retainer 34 has been pressed into the inner bore 32b, the projections 34a bite into or engage the inner circumferential surface of the inner bore 32b. Thus, the second retainer 34 is prevented from coming off of or being separated from the second piston 32. As a result, it is possible to easily assemble the second piston to which the second stopper 38, the second rod 36, the second retainer 34 and the second spring S2 are united to the cylinder housing 10.

In addition, a concave portion 32c is formed on the bottom surface of the inner bore 32b of the second piston 32 to receive the right end portion of the second rod 36. The inner diameter of the inner circumference of the concave portion 32c expands toward the inner bore 32b and the inner circumference of the concave portion 32c tapers toward the bottom of the concave portion 32c. Further, four holes are formed on the disc portion of the second retainer 34 in a manner similar to that shown in FIG. 4a. Thus, air mixed into the brake fluid which enters into the concave portion 32c is able to escape from the concave portion 32c through the holes and the piston ports 32a to the outer circumference side of the second piston 32. Therefore, air mixed into the brake fluid does not stay in the concave portion 32c.

The second stopper 38 can be made of metal and is disposed between the second spring S2 and the body 11. The right end portion of the second stopper 38 is engaged with a head portion 36a of the second rod 36 so as to be able to move backward with respect to the second rod 36.

Figure 2:
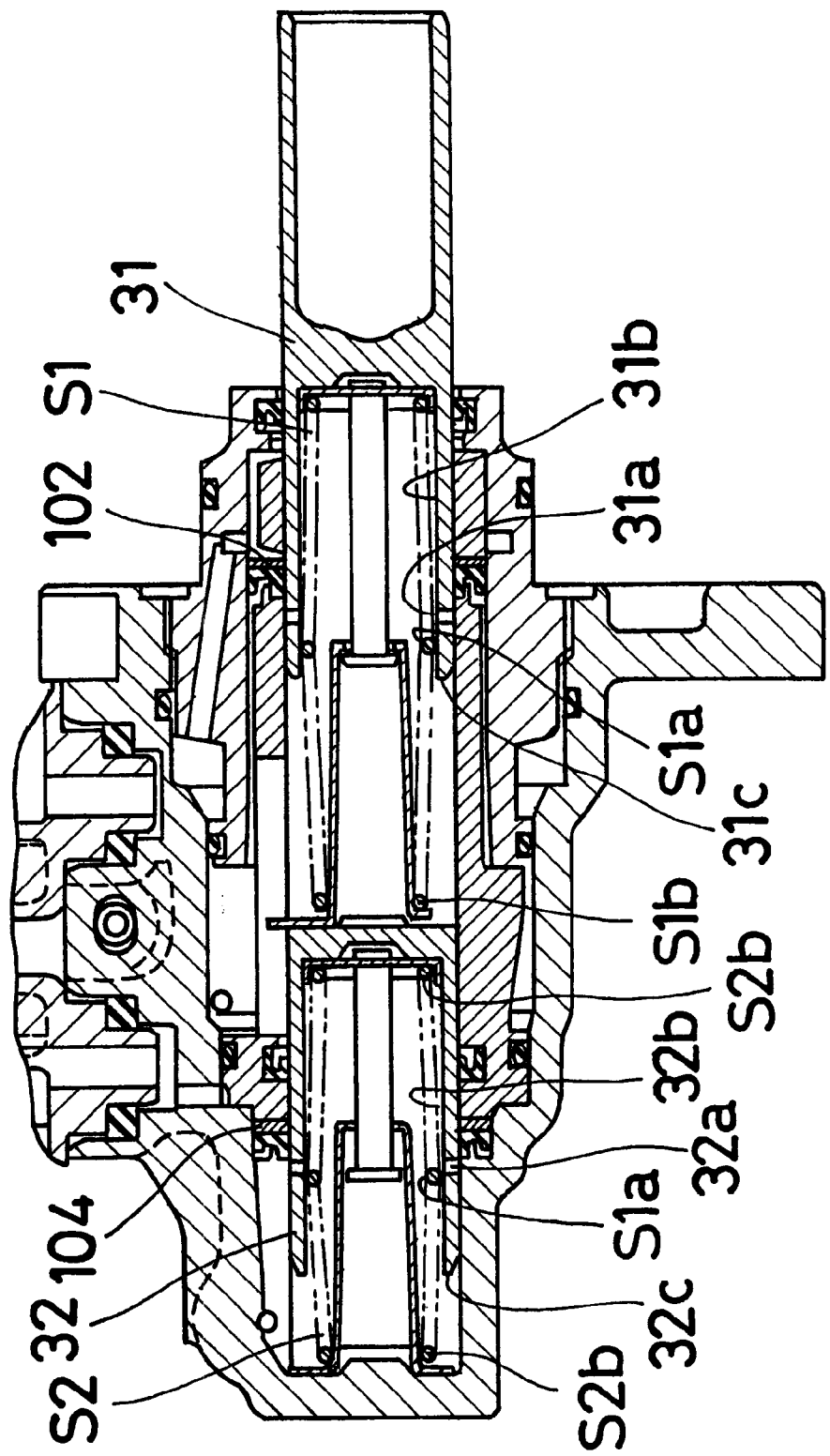
FIG. 2 is a cross sectional view of the master cylinder shown in FIG. 1 during a braking condition.

In the embodiment of the master cylinder have the structure described above, when the master cylinder is assembled to the vehicle and brake fluid is filled in the cylinder housing 10 to move the first piston 31 in the leftward axial direction of FIG. 1, the piston ports 31a of the first piston 31 pass through the second cup seal 102 as shown in FIG. 2. Thus communication between the first pressure chamber R1 and the reservoir connecting port P1 is blocked to generate pressure in the first pressure chamber R1.

In this case, the second piston 32 is moved in the leftward axial direction of FIG. 1, and the piston ports 32a of the second piston 32 pass through the fourth cup seal 104 to block communication between the second pressure chamber R2 and the reservoir connecting port P2 so that pressure is generated in the second pressure chamber R2. Accordingly, pressurized fluid is moved from the first pressure chamber R1 to the outlet port P7 and from the second pressure chamber R2 to the outlet port P8 to provide the intended braking effect to each wheel cylinder.

During the above-described operation of the master cylinder, the first spring S1 is compressed by the first piston 31 and the second piston 32, and the largest outer diameter portion S1a is always located in the inner bore 31b of the first piston 31. Therefore, the outer diameter of the forward portion of the first spring S1 with respect to the largest outer diameter portion S1a is always smaller than the inner diameter of the inner bore 31b. Accordingly, the coil portion of the first spring S1 does not contact the opening end surface 31d of the first piston 31. Thus, noise associated with contact between the first spring S1 and the first piston 31 is not likely to occur and preferably is not generated.

Further, when the first spring S1 is compressed by the first and second pistons 31, 32, the largest outer diameter portion S1a is located between the opening end surface 31d and the piston ports 31a at the initial stage of the braking operation in which the depressing amount of the brake pedal is relatively small. Therefore, even if the first spring S1 is biased in the radial direction of the inner bore 31b, air mixed in the brake fluid which is located between the first spring S1 and the inner circumference of the inner bore 31b can escape out through the piston ports 31a to the outer circumference side of the first piston 31. Therefore, air mixed in the brake fluid does not stay in the inner bore 31b.

In a manner similar to that described above with the first spring S1, the second spring S2 is compressed by the body 11 and the second piston 32 during the above-described operation of the master cylinder and the largest outer diameter portion S2a of the second spring S2 is always located in the inner bore 32b of the second piston 32. Therefore, the outer diameter of the forward portion of the second spring S2 with respect to the largest outer diameter portion S2a is always smaller than the inner diameter of the inner bore 32b. Accordingly, the coil portion of the second spring S2 does not contact the opening end surface 32d of the second piston 32 and so noise associated with contact between the second spring S2 and the second piston 32 is not likely to occur and preferably is not generated.

Further, when the second spring S2 is compressed by the second piston 32 and the body 11, the largest outer diameter portion S2a is located between the opening end surface 32d and the piston ports 32a at the initial stage of the braking operation in which the depressing amount of the brake pedal is relatively small. Therefore, even if the second spring S2 is biased in the radial direction of the inner bore 32b, air mixed in the brake fluid which is located between the second spring S2 and the inner circumference of the inner bore 32b can escape through the piston ports 32a to the outer circumference side of the second piston 32. Therefore, air mixed into the brake fluid does not stay in the inner bore 32b.

When the depression of the brake pedal is released, the first and second pistons 31, 32 are returned to their initial positions shown in FIG. 1 and the first and second pressure chamber R1, R2 are communicated with the reservoir 13 through the reservoir connecting ports P1, P2.

In accordance with the master cylinder construction described above, when a backward force is applied to the first piston 31 after the first piston 31 is assembled to the cylinder housing 10, the first piston 31 moves backward until the projection 37a of the first stopper 37 contacts the rear end of the guide groove 22a. After the projection 37a of the first stopper 37 contacts the rear end of the guide groove 22a, when a backward force is applied to the first piston 31, the reaction force against this force operates to the first piston 31 through the first stopper 37, the first rod 35 and the first retainer 33 and so the first piston 31 does not pull out of the cylinder housing 10.

Figure 5:
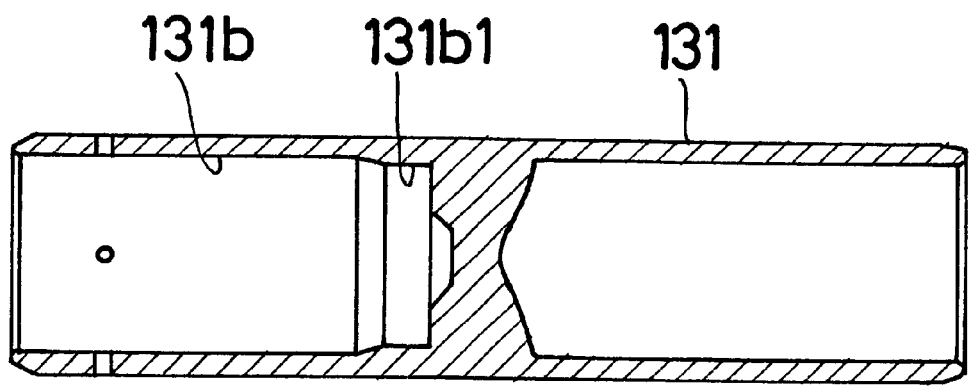
FIG. 5 is a cross-sectional view of a modified embodiment of the first piston.

FIG. 5 shows a modified construction of the first piston 131 that can be used in the master cylinder. In this embodiment, the first piston 131 is provided with a stepped inner bore 131b having a large diameter portion and a small diameter portion 131b1 which is located at the bottom side of the piston. The inner diameter of the large diameter portion of the inner bore 131b is larger than the outer diameter of the concentric circle in which the top end portion of each projections 33a on the first retainer is located. The inner diameter of the small diameter portion 131b1 is smaller than the outer diameter of the concentric circle in which the top end portion of each projections 33a of the first retainer is located. According to this modified version of the first piston, the first retainer 33 can be pressed into the small diameter portion 131b1 without damaging the inner circumferential surface of the large diameter portion of the first piston 131 by the projections 33a. This thus reduces the possibility of foreign objects being generated when the first retainer is positioned in the first piston.

Further, according to the above-described first embodiment and the modified embodiment, it is possible to relatively easily form the inner bore of the piston by forging and so on. thus, the cutting process is reduced and the manufacturing cost of the piston is decreased.

Figure 6A:
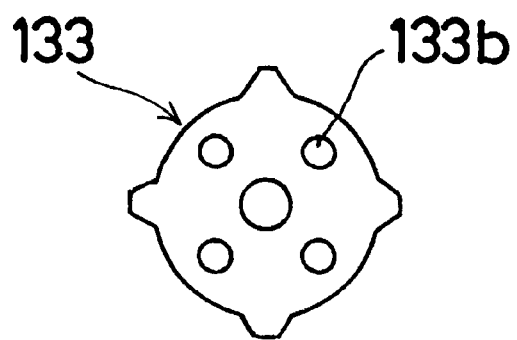
FIG. 6a is a plan view of a retainer according to another embodiment of the present invention.
Figure 6B:
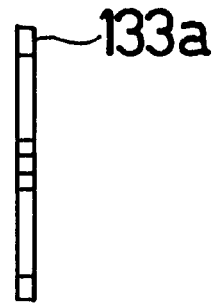

FIGS. 6a and 6b show a first retainer 133 according to a second embodiment. In this second embodiment, the disc shaped retainer 133 has four projections 133a, each of which projects outwardly from the outer circumference of the retainer 133 in the radial direction. The entire retainer 13 thus lies in a common plane. Adjacent projections 133a are separated from each other at equal intervals in the circumferential direction. The outer diameter of the projections 133a is larger than the inner diameter of the inner bore of the first piston. According to this embodiment, when a forward force is applied to the retainer 133 with respect to the first piston after the retainer is pressed into the inner bore of the first piston, the projections 133a bite into or engage the inner circumferential surface of the inner bore of the first piston and so the retainer 133 is prevented from coming off or becoming separated from the first piston. The retainer 133 can be relatively easily formed by a pressing process and so on, and so the manufacturing cost can be reduced. Further, the retainer 133 is symmetrical in the axial direction. Thus, it is possible to prevent the assembly of the retainer 133 by mistake in the axial direction. FIG. 6a also illustrates the holes 133b that are formed in the retainer to permit the escape of air.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A master cylinder comprising:
   a cylinder housing having a rearwardly opening inner bore;
   a piston having a forwardly opening bore, said piston being positioned in the inner bore of the cylinder housing;
   a spring disposed in the bore of the piston;
   a stopper supporting a front end of the spring;
   a retainer disposed in the bore of the piston and supporting a rear end of the spring;
   a rod for connecting between the retainer and the stopper while allowing the spring to be axially compressed; and
   a plurality of projecting portions formed on an outer circumferential portion of the retainer, with the retainer being pressed into the bore of the piston via the projecting portions.

2. The master cylinder according to claim 1, wherein at least a top portion of each projecting portion extends in an axial direction so as to be located in a concentric circle, with the concentric circle expanding in the axial direction.

3. The master cylinder according to claim 2, wherein the bore of the piston possess a stepped configuration including a larger diameter portion at a side of the bore of the piston located closer to the opening and a smaller diameter portion at a side of the bore of the piston located closer to a bottom of the bore of the piston, the inner diameter of the larger diameter portion being larger than a largest outer diameter of the projections and the inner diameter of the smaller diameter portion being smaller than the largest outer diameter of the projections.

4. The master cylinder according to claim 1, wherein the bore of the piston possess a stepped configuration including a larger diameter portion at a side of the bore of the piston located closer to the opening and a smaller diameter portion at a side of the bore of the piston located closer to a bottom of the bore of the piston, the inner diameter of the larger diameter portion being larger than a largest outer diameter of the projections and the inner diameter of the smaller diameter portion being smaller than the largest outer diameter of the projections.

5. The master cylinder according to claim 1, further comprising a seal cup disposed between the cylinder housing and the piston, and a piston port formed on the piston to communicate the bore of the piston to an outer circumferential portion of the piston, the spring including a largest outer diameter portion having an outer diameter that is larger than the outer diameter of both ends of the spring.

6. The master cylinder according to claim 5, wherein the largest outer diameter portion of the spring is located at a middle portion of the spring with respect to the axial direction, the largest outer diameter portion always being located in the bore of the piston.

7. The master cylinder according to claim 6, wherein the largest outer diameter portion is located between the piston port and an opening end surface of the piston.

8. The master cylinder according to claim 5, wherein the largest outer diameter portion is located between the piston port and an opening end surface of the piston.

9. The master cylinder according to claim 1, wherein the retainer includes a plurality of holes.

10. A master cylinder comprising:
    a cylinder housing having an inner bore that is open at a rearwardly facing end of the cylinder housing;
    a piston positioned in the inner bore of the cylinder housing, the piston having a bore that is open at a forwardly facing end of the piston;
    a spring disposed in the bore of the piston;
    a stopper supporting a front end of the spring;
    a retainer disposed in the bore of the piston and supporting a rear end of the spring, the retainer being disc-shaped and possessing a plurality of circumferentially spaced apart and radially outwardly directed projecting portions that engage an inner surface of the bore in the piston; and
    a rod extending between the retainer and the stopper in a manner that allows the spring to be axially compressed.

11. The master cylinder according to claim 10, wherein each of the projecting portions has a top end that is bent in a direction towards the stopper.

12. The master cylinder according to claim 11, wherein the bore of the piston possess a stepped configuration including a larger diameter portion located at a side of the inner bore closer to the forwardly facing end of the piston and a smaller diameter portion located closer to a bottom of the bore in the piston.

13. The master cylinder according to claim 12, wherein the inner diameter of the larger diameter portion of the spring is larger than a largest outer diameter of the projections and the inner diameter of the smaller diameter portion of the spring is smaller than the largest outer diameter of the projections.

14. The master cylinder according to claim 10, wherein the bore of the piston possess a stepped configuration including a larger diameter portion located at a side of the inner bore closer to the forwardly facing end of the piston and a smaller diameter portion located closer to a bottom of the bore in the piston.

15. The master cylinder according to claim 10, further comprising a seal cup disposed between the cylinder housing and the piston, and a piston port formed on the piston to communicate the bore of the piston to outside the piston, the spring including a largest outer diameter portion having an outer diameter that is larger than the outer diameter of both ends of the spring.

16. The master cylinder according to claim 15, wherein the largest outer diameter portion of the spring is located at a middle portion of the spring with respect to the axial direction, the largest outer diameter portion always being located in the bore of the piston.

17. The master cylinder according to claim 16, wherein the largest outer diameter portion is located between the piston port and the forwardly facing end of the piston.

18. The master cylinder according to claim 10, wherein the retainer includes a plurality of holes.

19. The master cylinder according to claim 18, wherein a bottom end of the bore in the piston is provided with a tapering recessed region.

\* \* \* \* \*